United States Patent [19]

Wells

[11] 3,842,408

[45] Oct. 15, 1974

[54] REMOTE INDICATOR SYSTEM

[76] Inventor: Richard C. Wells, 8457 Sunset Rd., Minneapolis, Minn. 55432

[22] Filed: Aug. 14, 1972

[21] Appl. No.: 280,566

[52] U.S. Cl. .............................. 340/216, 340/309.4
[51] Int. Cl. .......................................... G08b 29/00
[58] Field of Search ...... 340/216 R, 171 PF, 412 R, 340/208 R

[56] References Cited
UNITED STATES PATENTS

| | | | |
|---|---|---|---|
| 2,900,607 | 8/1959 | Barabuttes | 340/208 X |
| 3,204,245 | 8/1965 | Dykaar | 340/310 R |
| 3,334,340 | 8/1967 | McConnell | 340/216 R |
| 3,357,009 | 12/1967 | Rusnak | 340/216 R |
| 3,399,397 | 8/1968 | Josephson | 340/216 R |
| 3,453,599 | 7/1969 | Lester | 340/171 PF |
| 3,458,657 | 7/1969 | Lester | 340/310 A |
| 3,460,121 | 8/1969 | Wattenburg | 340/310 A |
| 3,566,384 | 2/1971 | Smith | 340/208 X |
| 3,641,539 | 2/1972 | Lesher | 340/412 X |

*Primary Examiner*—Harold I. Pitts

[57] ABSTRACT

A system for providing an indication of a remote condition, as a cycle of a machine. A transmitter coupled to the machine operates to separately sense different conditions of the machine and transmits separate signals corresponding to the sensed conditions of the machine. The signals are carried via the conventional electric power distributing lines to a receiver and indicator apparatus. The indicator apparatus functions to selectively sense the signals from the receiver to provide a visual indication of the sensed condition of the machine.

18 Claims, 5 Drawing Figures

REMOTE INDICATOR SYSTEM

BACKGROUND OF THE INVENTION

Remote indicating devices for providing information as to the cycle and "On-Off" conditions of washers and dryers are known. The remote indicating device disclosed in my U.S. Pat. No. 3,531,791 has separate indicator lamps for each cycle of the machine and an indicator lamp showing if the machine is turned off. The lamps are connected to the machine with power lines having current-limiting electrical elements and in a manner such that the machine must be properly grounded before the apparatus is operational. This device requires a separate wiring system between the machine and the indicator. Once the wiring has been completed, the remotely located indicator cannot be relocated without rewiring.

McConnell, in U.S. Pat. No. 3,334,340, discloses a remote signal device for use with appliances, as a washer, to provide information as to the cycle of operation of the washer. The device has a condition responsive switch which operates a transmitter. The signals from the transmitter are carried through the alternating current distribution system which supplies power to the machine to a receiver. The transmitter functions to send a signal at a selected frequency to provide information as to one condition of the machine. The receiver will pick up the signal and provide information as to this one condition of the machine. Additional transmitters are utilized for each condition of the machine. A single transmitter cannot provide a signal for more than one condition of the machine.

It is an object of the invention to provide a remote signaling system which utilizes a transmitter operable to sense a plurality of signals and to selectively transmit a plurality of signals to a signal receiving and indicating apparatus. Another object of the invention is to provide a safe and low-cost remote indicating system for appliances, as washers and dryers. A further object of the invention is to provide an information transmitter and receiver system usable as personal information system, as a safety system for machines, to detect malfunctions in operating conditions of machines, and a system operating a light switch arrangement. A further object of the invention is to provide a remote signaling system which does not require separate power lines between the transmitter and the remotely located receiver and indicator.

SUMMARY OF THE INVENTION

The invention broadly relates to an indicating system operable to provide remote information of a condition. The condition can be a cycle or malfunction of a machine, the presence of personnel or similar sensed conditions. The indicating system has one or more transmitters operable to transmit bursts of radio frequency energy of a given frequency. A receiver sensitive to the selected frequencies provides separate information in response to the separate energy signals transmitted. In one form of the invention, two transmitters are connected to a clothes washer timer and one transmitter is connected to a clothes dryer timer. The signals from these transmitters are carried via the conventional power distribution lines connected to the washer and dryer to a receiver. The receiver has circuits and indicating devices that are selectively operable in response to the received signals to provide information as to the various cycles of the washer and dryer and on-off conditions of these machines.

DESCRIPTION OF PREFERRED EMBODIMENT

Figure 1:
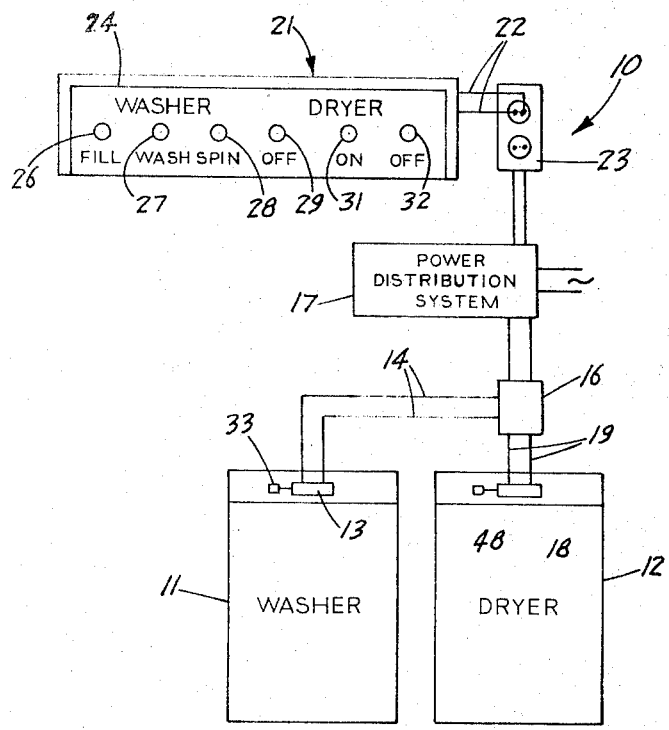
FIG. 1 is a schematic view showing the remote indicator system of the invention coupled to an electric washer and a dryer.

Referring to FIG. 1, there is shown the remote indicating system of the invention indicated generally at 10 for sensing the operating cycles and "On-Off" conditions of electric washer 11 and a dryer 12. Washer 11 is a conventional automatic washing machine having a timer 13 to control the cycles of the machine as well as the on and off phases of the machine. Power lines 14, connected to a conventional electrical outlet 16, supply electric power to the washer including the timer 13. The outlet 16 is part of the conventional electrical power distribution system found in the home. For example, the system can be a 60 cycle alternating current, 120 volt system. The dryer 12 has a timer 18 and power lines 19 connected to the electrical outlet 16 to provide the dryer with electrical power.

An indicator apparatus, indicated generally at 21, is located at a point remote from the washer 11 and dryer 12. Preferably, indicator apparatus 21 is located in the kitchen where it can be readily observed by the housewife. Indicator apparatus 21 has a power cord 22 that is plugged into an electrical outlet 23. The remote indicator apparatus 21 has a housing 24 which can be supported on a cabinet or shelf. Alternatively, the housing 24 can be mounted directly on the wall. The indicator apparatus 21 has washer lamps, indicator devices or information means 26, 27, 28 and 29 to indicate respectively the fill, wash, spin and off cycles of the machine. The indicator apparatus 21 also has dryer lamps, indicator devices or information means 31 and 32 operable to indicate the on and off conditions of the dryer.

Figure 2:
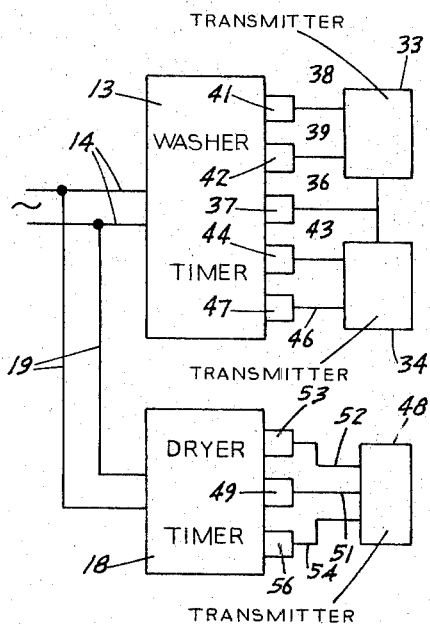
FIG. 2 is a schematic view of the timers of the washer and dryer coupled to signal transmitters.

The washer lamps 26, 27, 28 and 29 are energized with signals or energy from transmitters 33 and 34 connected to the washer timer. As shown in FIG. 2, the transmitters 33 and 34 are connected to a common line 36 coupled to a timer terminal 37. Power lines 38 and 39 connect the transmitter 33 with separate washer terminals 41 and 42. Piggy back spade connectors (not shown) are used to connect the transmitter 33 to the washer timer terminals. The transmitter 34 is connected with power lines 43 and 46 to washer timer terminals 44 and 47 respectively.

A separate transmitter 48 is connected to dryer timer terminal 49 with a ground line 51. Power lines 52 and 54 connect the transmitter 48 to dryer timer terminals 53 and 56 respectively.

Figure 3:
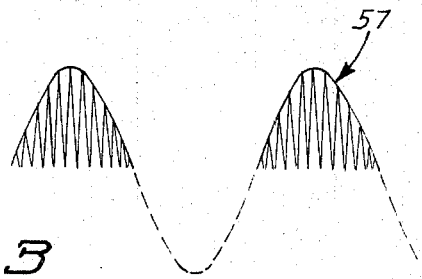
FIG. 3 is a signal diagram of a transmitter.

The transmitters 33, 34 and 48 are substantially identical in structure and function except that each is tuned to generate radio frequency signals of a discrete frequency in response to power signals from the respective timer contacts. These discrete frequency signals are transmitted via the power distribution system to the receiver and indicator 21 to selectively energize the lamps. FIG. 3 shows a typical signal, indicated generally at 57.

Figure 4:
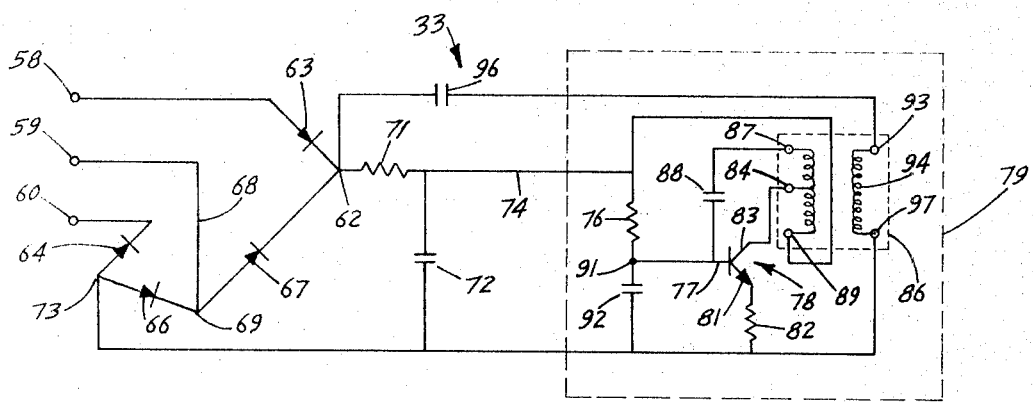
FIG. 4 is a circuit diagram of the transmitter.

FIG. 4 illustrates by means of a schematic circuit diagram the preferred embodiment of the transmitter 33 used in the system of FIG. 2 to impress signals indicative of the current operating state or condition of the appliance on the power lines to which the appliance is connected. More specifically, the alternating current power lines 14 are adapted to be connected by means of the appliance timer contacts to the input terminals 58, 59 and 60, terminal 59 being the common or ground connection. Terminal 58 is connected to a junction point 62 by means of a semiconductor diode 63 which is poled as illustrated in FIG. 4. Terminal 60 is coupled to the junction 62 through the diodes 64, 66 and 67. The common terminal 59 is connected by means of a conductor 68 to the junction point 69 between the diodes 66 and 67. A resistor 71 and a capacitor 72 are connected in series between the junction 62 and a junction point 73 which is the common point between the diodes 64 and 66.

A direct current voltage (rectified alternating current) is developed across the capacitor 72 and is coupled by means of a conductor 74 and a resistor 76 to the base or control electrode 77 of an NPN transistor 78 which is the active element of a conventional transformer feed-back oscillator circuit. This circuit is illustrated as being enclosed by the dashed line box 79. The emitter electrode 81 of transistor 78 is coupled through a resistor 82 back to the junction point 73. The collector electrode 83 of the transistor 78 is coupled to the center tap terminal 84 of primary winding of the transformer 86. One of the two outer terminals 87 is coupled by means of a tuning capacitor 88 to the base electrode 77 while the other outer terminal 89 is coupled through the resistor 76 to a junction point 91 formed between the base connection 77 of transistor 78, the resistor 76 and a capacitor 92. A first terminal 93 of the secondary winding 94 of the transformer 86 is coupled by means of a capacitor 96 to the junction point 62 and the other terminal 97 of said secondary winding 94 is connected to the junction point 73. With these specifics of the construction of the circuit in mind, consideration will now be given to its mode of operation.

As was mentioned, the terminals 58, 59 and 60 are adapted to be connected to a source of alternating current such as a 115 v, 60 cycle supply by way of the control or timer mechanism and at any given point in time the source is applied between either terminals 58, 59 or 59, 60. Assuming the power is applied between terminals 58 and 59, during the half cycle when terminal 58 is positive with respect to the common terminal 59, diodes 63 and 64 will be conducting to produce half-wave rectification and will charge the capacitor 72 through the resistor 71 to provide the requisite direct current supply for the oscillator 79. When the timer contacts connect the alternating current supply across terminals 59, 60 and when the terminal 60 is negative with respect to the common terminal 59, the diodes 64 and 67 will be conductive to maintain the capacitor 72 fully charged. Thus, the alternating current supply is rectified and then filtered by means of the resistor 71 and capacitor 72 to provide the direct current operating potential or bias for the oscillator 79. This DC potential is applied by means of conductor 74 and the bias resistor 76 to the base or control electrode 77 of the transistor 78. The resistor 82 connected in the emitter circuit serves to establish the proper operating point for the transistor 78.

The combination of the transformer 86 with its feedback connection through the tuning capacitor 88 to the base electrode 77 operates in a conventional fashion to produce high frequency oscillation, which oscillations are coupled from the secondary winding 94 back into the power lines by the coupling capacitor 96. The frequency of oscillation can be controlled over a predetermined range of values by means of the tuning capacitor 88. The value of capacitor 72 is small such that the voltage on conductor 74 follows the applied input. As a result, the oscillator produces its high frequency output only during one-half cycle of the input.

The particular power line to which the oscillator output will be applied is determined by the conduction state of the diode pairs 63, 66 EG or 64, 67 FH which, in turn, depends upon the phase of the alternating current supply connected to the terminals 58 and 60 and the setting of the timer contacts. During the half cycle of the alternating current input that diodes 63, 66 are conducting, high frequency signals from the oscillator 79 will be applied to the building's power lines connected to terminals 58, 60. When diodes 64, 66 are conducting, the high frequency signals will be coupled to the lines connected to terminals 59, 60. Thus, by constructing the transmitter 33 in accordance with the foregoing teachings it is possible to obtain control signals in a multiplex fashion over the power lines connected to the terminals 58 and 60 which, in turn, is dependent upon the setting of the timer contacts.

Figure 5:
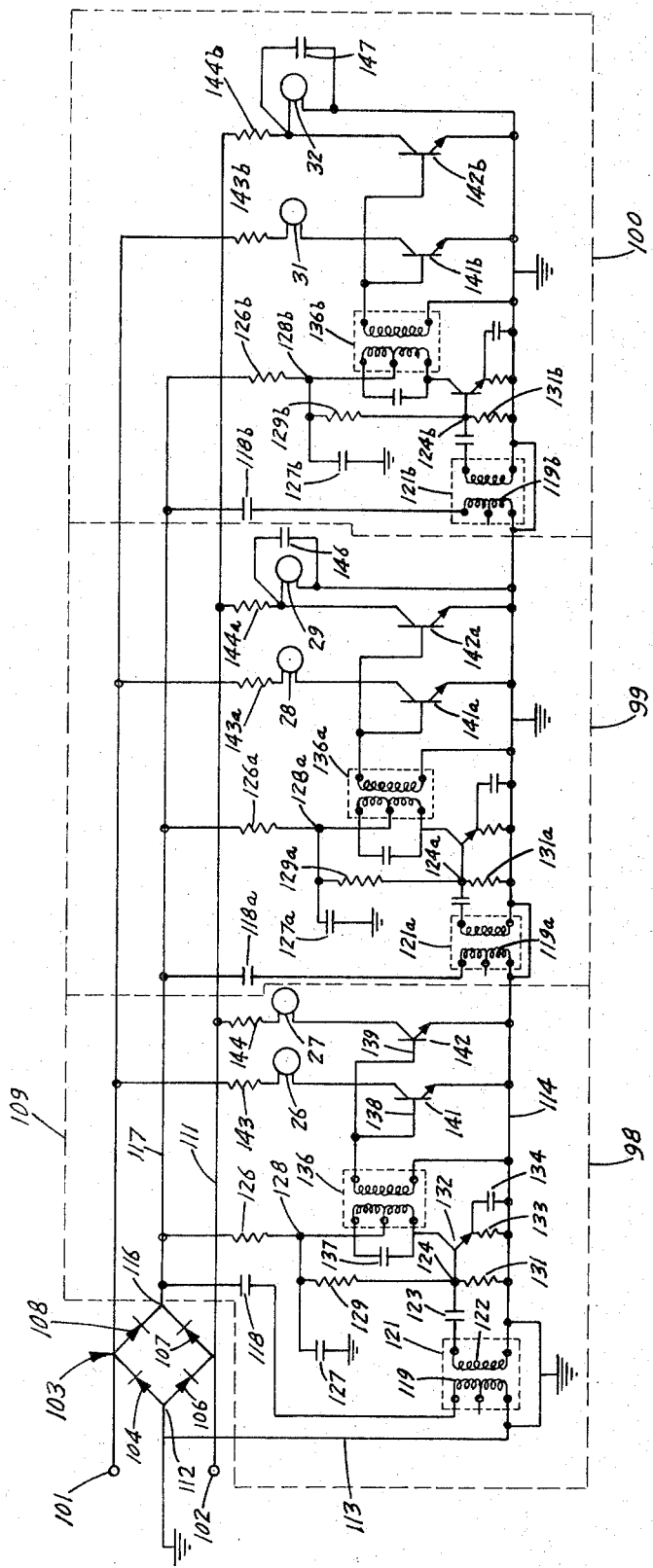
FIG. 5 is a circuit diagram of the receiver having information indicator devices.

FIG. 5 illustrates by means of schematic diagram the preferred embodiment of the receiver 21 which may be used in the system of the present invention. This receiver 21 is adapted to produce an indication of the operating status of an appliance or machine connected to the power mains of a building when the transmitter of FIG. 4 is utilized in conjunction therewith. The receiver is comprised of three substantially identical stages, shown enclosed by dashed boxes 98, 99 and 100. As will be explained more fully hereinbelow, with these three stages it is possible to indicate by means of lamps 26–32 or other suitable indicator devices six separate events or conditions, provided three transmitters, each of a different frequency, are utilized in the system. If for any reason it is desired to indicate a greater number of conditions through the use of additional transmitters, further substantially identical stages may be added. Because of the multiplexing feature mentioned above, each transmitter is able to convey two discrete events to a single receiver stage.

Since only a slight difference exists in the circuitry in these separate stages, it is felt that a detailed explanation of the construction of stage 98 need only be given since it will be readily apparent to one skilled in the art how the remaining stages are wired. The various components used in stage 98 will be identified by appropriate numerals and lead lines. Components located in stages 99 and 100 having an identical connection and function will be identified with the same numeral as in stage 98 but with the alphabetic characters a and b used to designate components in these respective stages.

The terminals 101 and 102 are adapted to be connected to the same alternating current supply as are the transmitters of FIG. 4 so that the high frequency oscillations produced thereby will be carried over these power lines to the receiver. The terminals 101 and 102 are connected to a full-wave bridge rectifier 103 which is comprised of diodes 104, 106, 107 and 108. The input terminal 101 is also connected to a buss 109 which leads to the other stages 99 and 100. Likewise, the terminal 102 is connected to a buss 111. The terminal 112 between diodes 104 and 106 is connected by a conductor 113 to a grounded buss 114 which is common to all of the stages. Finally, the junction 116 between the rectifier diodes 107 and 108 is connected to still another buss 117.

Capacitor 118 in stage 98 and the primary winding 119 of a transformer 121 are connected in series between the buss 117 and the ground buss 114. Similarly, the capacitors 118a and 118b along with the primary windings of transformers 121a and 121b in stages 99 and 100 perform this same function.

The secondary winding 122 of transformer 121 has a first terminal connected to a ground buss 114 and a second terminal coupled through a capacitor 123 to a junction point 124. A resistor 126 and a capacitor 127 are connected between the buss 117 and ground to thereby provide a direct current potential at junction 128. A resistor 129 connected between junctions 128 and 124 form one-half of a voltage divider. The resistor 131 which is connected between the junction 124 and the ground buss 114 comprises the other half of the voltage divider so that the potential appearing at junction 124 can be set at a desired level.

The control or base electrode of an NPN transistor 132 is coupled to this junction 124 so that the operating bias for the transistor 132 can be readily adjusted. The emitter electrode of transistor 132 is coupled to the grounded buss 114 by means of a parallel connection of a resistor 133 and a capacitor 134. The collector electrode of the transistor 132 is connected to a first terminal of a tunable coupling transformer 136 whose center tap is connected to the terminal 128 between the resistor 126 and the capacitor 127. A tuning capacitor 137 is connected in parallel with the primary winding of the transformer 136. The secondary winding of the transformer has one of its terminals connected to the ground buss 114 and its other terminal connected to the base electrodes 138 and 139 of a pair of NPN transistors 141 and 142. The transistor 132 and associated transformer 136 form a tuned amplifier which operates in a conventional fashion to amplify signals in a given frequency band. The output electrodes of transistor 141, i.e., the emitter and collector electrodes, are connected in series with an indicator lamp 26 and a resistor 143 between the buss 109 and the ground buss 114. The output electrodes of the transistor 142 are connected in series with an indicator lamp 27 and a resistor 144 between the buss 111 and the ground buss 114.

A slight difference exists in the manner in which the indicator lights 29 and 32 are connected in stages 99 and 100, respectively. Rather than being serially connected with the output electrodes of their associated transistor, the indicator lamps 29 and 32 are connected in parallel with the output electrodes and with capacitors 146 and 147 of the respective stages. Other than this last mentioned difference, the various connections are identical in all the stages.

The 60 cycle alternating current supply connected to the terminals 101 and 102 is full-wave rectified by means of the bridge 103 to provide a direct current bias to the transistors 132, 132a and 132b. More specifically, the filter capacitors 127, 127a and 127b are charged through resistors 126, 126a and 126b so that a DC potential is established at the junction points 128, 128a and 128b and this potential is applied by use of the voltage dividers comprising the resistors 129 and 131 in stage 98 and the corresponding resistors in stages 99 and 100 to which the bases of the transistors 132, 132a and 132b are connected. The capacitors 118, 118a and 118b couple the high frequency oscillations generated by the transmitter circuit of FIG. 4 to the primary windings 119, 119a and 119b of the tuned input transformers 121, 121a and 121b respectively. The transformers 121, 121a and 121b are preferably adjustable so that the inductance thereof can be tuned to resonate at a predetermined frequency so as to provide a pass band for signals of a given high frequency. Thus, stage 98 can be made to respond to a frequency $f_1$ while stages 99 and 100 respond to radio frequency signals of frequencies $f_2$ and $f_3$ respectively.

In stage 98, the input transformer 121 along with the transistor 132 and output transformer 136 comprises a tuned amplifier the output of which is used to drive the transistors 141 and 142. It is to be noted that transistors 141 and 142 have their output electrodes connected in series with the indicator lamps 26 and 27 across opposing sides of the alternating current lines. Thus, it is only when the 60 cycle input signal is of a first phase such that the collector electrode of transistor 141 is connected to a positive potential and a high frequency input signal is applied to its base electrode that it can be rendered conductive so as to allow sufficient current flow through the indicator 26 to cause it to operate. If the 60 cycle input is of the opposite phase such that buss 111 is positive and a high frequency output is applied to the base electrodes of the transistors 141 and 142, only transistor 142 will be rendered conductive to cause indicator lamp 27 to operate.

As explained above, the input transformers 121, 121a and 121b in stages 98, 99 and 100 are each tuned to a different frequency so that with three transmitters of the type illustrated in FIG. 4 in operation (each generating an output of a different frequency) a total of six different conditions can be indicated.

As mentioned earlier, the lamps 29 and 32 are connected in circuit with their associated control transistors 142a and 142b in a slightly different fashion than the other indicator devices in the receiver. Whereas the indicator devices 26, 27 28 and 31 are arranged to operate when their associated transistors 141, 142, 141a and 141b are turned on, the indicator devices 29 and 32 are disabled (shorted out) only so long as their associated control transistors 142a and 142b are conducting. In the event that transistors 142a or 142b are turned off, the device 29 or 32 will be connected across the AC supply and will be operative. The capacitors 146 and 147 connected in parallel with the lamps 29 and 32 serve to keep these lamps off during the half cycle periods when transistors 142a and 142b are not conducting because the buss 111 is negative with respect to ground.

The following table of component values is given by way of example as other types of components and values can be used to provide a functioning system.

Transmitter 33:
Diodes 63, 64, 66, 67 — 200V PIV ½ amp.
Resistor 71 — 3,900 ohm

Capacitor 72 — 0.01 mf 600 V.
Resistor 76 — 100 K
Resistor 82 — 56 ohm
Capacitor 88 — 270 mf
Capacitor 92 — 0.01 mf
Capacitor 96 — 0.047 mf 600 V.
Receiver 21:
Resistors 143, 144 — 10K ¼ watt
Resistor 126 — 82K ¼ watt
Resistor 129 — 150K ¼ watt
Resistor 131 — 10K ¼ watt
Capacitor 118 — 1,000 pf 600 volts
Capacitor 137 — 1,000 pf 50 volts
Capacitor 123 — 0.02 mf 50 volts
Capacitor 134 — 0.047 mf 50 volts
Capacitors 146, 147 — 0.047 mf 200 volts
Capacitor 127 — 0.150 volts
Diodes 104, 106, 107, 108 — 200 volts PIV ½ amp.

Transistor 132 — VCE 50 volts NPN
Transistors 141, 142 — VCE 170 volts NPN

Opposite polarity transistors may be used provided the appropriate voltage polarities are observed. The remote indicator system has been described relative to a washer and dryer used as laundry equipment. The system is usable with other machines to provide information as to the operating or non-operating condition of the machine, as over-heating, malfunction and the like.

The embodiments of the invention in which an exclusive property or privilege is claimed are defined as follows:

1. An apparatus for indicating the operation cycles of a washer and dryer comprising: indicator means remotely spaced from the washer and dryer for providing separate information on each operational cycle of the washer and dryer, said indicator means having first information means for each cycle of the washer and second information means indicating the "off" condition of the washer, a third information means indicating the "on" condition of the dryer and a fourth information means indicating the "off" condition of the dryer and circuit means connected to each of the first, second, third and fourth information means and to an outlet socket of an electrical distribution system, said washer having a washing timer and said dryer having a drying timer, first signal transmitter electrically connected to the washer timer to activate the first transmitter and second signal transmitter electrically connected to the dryer timer to activate the second transmitter, each of said signal transmitters having electric circuit means operable to establish a plurality of energy signals, said circuit means including feed-back oscillator circuit means and semiconductor means operable when subjected to electrical energy from the timers to provide separate energy signals having separate frequencies related to the electrical energy from each cycle of the timers, said energy signals being carried via the electrical power distribution system to the receiving circuit of the indicator, said receiving circuit being responsive to said signals to selectively energize the first, second, third and fourth information means in accordance with the frequency of the signal providing information as to the cycles of the washer and dryer.

2. The apparatus of claim 1 including: a third signal transmitter electrically connected to the washer timer, said first and third transmitters being activated in response to electric power from the washer timer to establish energy signals related to the cycle of the washer.

3. The apparatus of claim 1 wherein: the first, second, third and fourth information means are electric operated lamps operable to provide a visual indication of the cycles of the washer and dryer.

4. The apparatus of claim 1 wherein: the circuit means of the indicator means includes rectifier means operable to provide a DC bias, means to pass signals of a given frequency, and means responsive to said passed signals to provide energy to one of said first, second, third and fourth information means.

5. The apparatus of claim 1 wherein: the circuit means of the indicator means has a plurality of stages, each stage having means tuned to signals of a selected frequency corresponding to the signal frequencies generated by the first and second transmitter means.

6. The apparatus of claim 5 wherein: each stage includes means to pass signals of a given frequency, and means responsive to said passed signals to provide energy to the associated first, second, third and fourth information means.

7. An apparatus usable with an electrical power distribution system for indicating operation conditions of a machine having means related to the operation or condition of the machine comprising: indicator means remotely spaced from the machine for providing separate information on selected conditions of the machine, said indicator means having separate information means for providing information as to said conditions of the machine and circuit means connected to each information means and to the electrical power distribution system, a signal transmitter electrically coupled to the means related to the operation of or condition of the machine to activate the transmitter, said signal transmitter having electric circuit means operable to establish a plurality of energy signals, said circuit means including feed-back oscillator circuit means and semiconductor means operable when subjected to electrical energy from the means related to the operation or condition of the machine to provide separate energy signals having separate frequencies related to said electrical energy, said signals being carried via the electrical power distribution system to the indicator circuit means, said indicator circuit means being responsive to one or more of said signals to selectively energize the indicator means in accordance with the operations or conditions of the machine.

8. The apparatus of claim 7 including: a second transmitter, said first and second transmitters being separately connected to the means related to the operation of and condition of the machine and activated in response to electric power from the means related to the operating of and condition of the machine.

9. The apparatus of claim 7 wherein: said machine is a washing machine having a cycle timer, said indicator means having information means which correspond to the operating cycles of the washing machine established by the cycle timer.

10. The apparatus of claim 7 wherein: said indicator means has a plurality of lamp information means.

11. The apparatus of claim 10 wherein: the circuit means of the indicator means includes rectifier means operable to provide a DC bias, means to pass signals of a given frequency, and means responsive to said passed signals to provide energy to said information means.

12. The apparatus of claim 7 wherein: the circuit means of the indicator means has a plurality of stages, each having means tuned to signals of a selected frequency corresponding to the signal frequencies of the transmitter.

13. The apparatus of claim 12 wherein: each stage includes information means, means to pass signals of a given frequency, and means responsive to said passed signals to provide energy to the information means.

14. An apparatus usable with an electrical power distribution system for indicating one or more conditions comprising: indicator means having information means related to selected conditions and circuit means connected to each information means and to the electrical power distribution system, a signal transmitter having electric circuit means operable to establsih a plurality of energy signals in response to one or more of said selected conditions, said circuit means including feedback oscillator means and semiconductor means operable when subjected to electrical energy related to one or more of said conditions to provide separate energy signals having separate frequencies related to said electrical energy, said signals being carried via the electrical power distribution system to the indicator circuit means, said indicator circuit means being responsive to one or more of said signals to selectively energize the indicator means in accordance with separate frequencies of said signals whereby information is provided as to one or more conditions.

15. The apparatus of claim 14 wherein: said information means are electric lamp means.

16. The apparatus of claim 14 wherein: the circuit means of the indicator means includes rectifier means operable to provide a DC bias, means to pass signals of a given frequency, and means responsive to said passed signals to provide energy to said information means.

17. The apparatus of claim 14 wherein: the circuit means of the indicator means has a plurality of stages, each having means tuned to signals of a selected frequency corresponding to the signal frequencies of the transmitter.

18. The apparatus of claim 17 wherein: each stage includes information means, means to pass signals of a given frequency, and means responsive to said passed signals to provide energy to the information means.

* * * * *